Patented July 10, 1951

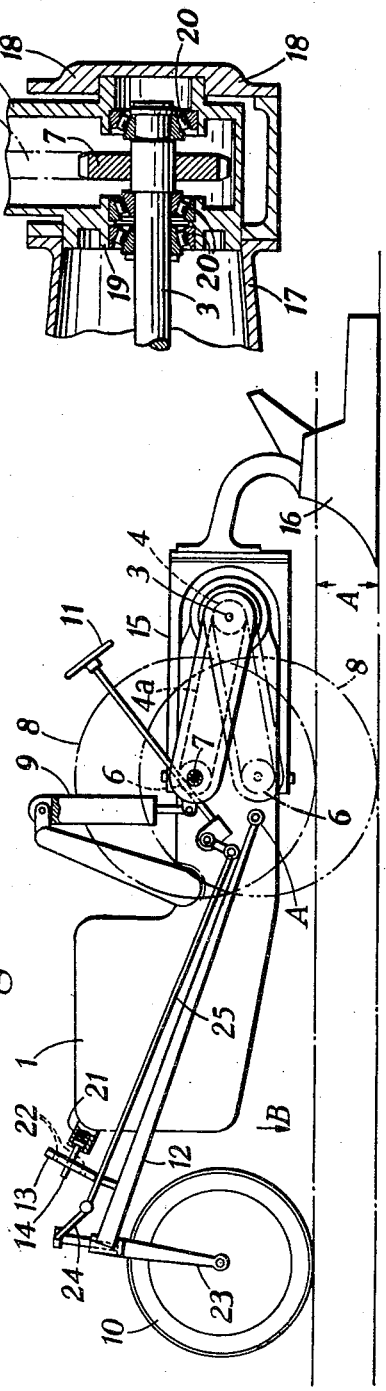
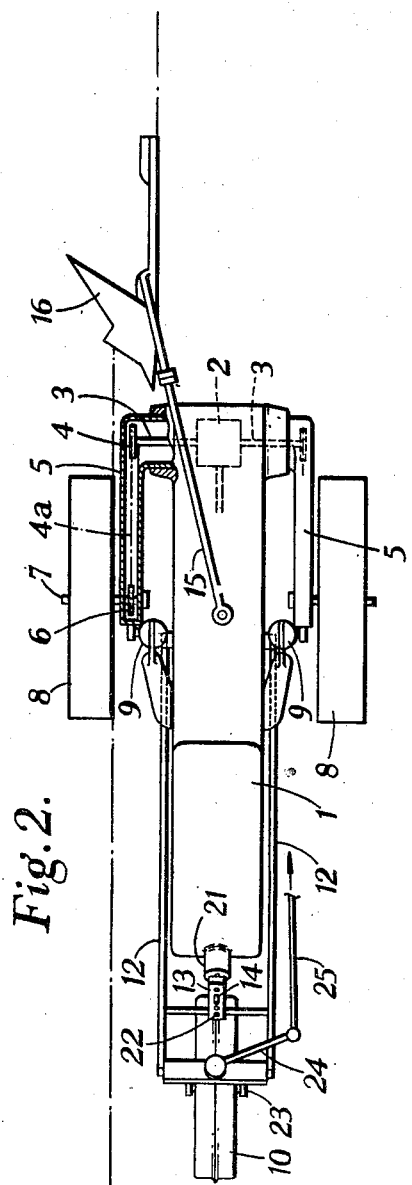

2,559,758

UNITED STATES PATENT OFFICE 2,559,758

POWERED AGRICULTURAL TRACTOR AND WHEEL ADJUSTING MECHANISM THEREFOR

Albert de Jouëtte, Toulon, France

Application August 1, 1947, Serial No. 765,536
In France July 25, 1946

Section 1, Public Law 690, August 8, 1946
Patent expires July 25, 1966

1 Claim. (Cl. 180—41)

In the work of tilling the soil which always remains as the basis of agricultural development, experience shows more and more that motor cultivator tilling is, other things being equal, more efficacious than that done with a tractor with three or four wheels and having a plough carried or towed. But it is often difficult to drive and for that reason it cannot exceed a certain power and a certain weight.

On the other hand, like the other tractors with wheels which go with one motorised wheel in the furrow, it is impossible to exceed a certain depth of work because of the too steep slope of the tractor. Again, not any tractor or motor cultivator can work on ground with a steep gradient.

While retaining the advantages of the motor cultivator and the wheeled tractors, the application of these improvements, forming the object of the present invention has for its purpose to improve at the same time the yield and the facility of manoeuvring of these tools which one can designate under the name of auto-cultivators.

These improvements are shown in the accompanying schematic drawing given by way of explanation of their functioning and likewise as a non-limiting example for their execution.

In this drawing—

Figure 1 shows in elevation, the assembly of an auto-cultivator according to the invention; Fig. 2 shows the same auto-cultivator seen in plan. Fig. 3 is a horizontal section showing details of coupling means for motorised wheel supports.

In the example shown, the auto-cultivator comprises and is operated by a motor unit 1 with a transmission of known kind. A differential 2 coupled thereto is of the usual kind and operates motorised wheels 8 one at either side which are arranged to be movable in the vertical plane. For this purpose as shown in Fig. 3, the motor has a rear axle casing 17 which is fixed thereto and at the two extremities of which movable gear cases 5 can pivot vertically in bearings 18, the gear cases 5 constituting at the same time supporting arms for the motorised wheels 8. In the example of construction given, the bearing surfaces 19 of the movable gear cases 5 turn by means of roller bearings 20 arranged about the shafts 3. The differential 2 transmits the power by the shaft 3 to the motorised wheels 8 via toothed wheels 4, chains 4a, pinions 6, and journals 7, and the shafts 3 and journals 7 are journalled in the gear cases 5 by means of bearing surfaces. Each of the gear cases 5 is joined (see Figure 1) by its extremity opposite the corresponding shaft to the piston rod of a hydraulic jack 9 the stroke of the piston of which corresponds to the maximum displacement of the corresponding motorised wheel 8 in the vertical plane. This device is identical for each of the gear cases 5. The construction of the bearing structure is illustrated only by way of example in Figure 3 and obviously could have any other known form. To steer the motor cultivator a steerable wheel 10 is carried on a steering shaft 23 rotatably secured at the front end of a rigid supporting bracket 12 which can turn freely in a vertical plane about a coupling axis A passing transversely through the body of the motor cultivator. The steering shaft 23 is coupled by a crank 24 and link rod 25 to a steering wheel 11.

A complementary coupling is provided at the forward end of bracket 12 and is set by the driver so as to avoid oscillation about the shaft A and to ensure the immobilisation of the bracket relative to the chassis. An example of this forward coupling is shown in the drawing and comprises a sector 13 fast to the bracket 12 and a stop 14 slidably movable against spring-loading in a casing 21 fast to the motor unit. The relative position of the bracket 12 with respect to the motor unit is set by location of the stop 14 in one of the corresponding holes 22 in the sector 13.

The use of the piston rods of the hydraulic jacks 9 constitutes the point of pressure and immobilisation of the gear cases 5 of which the point of oscillation on the frame of the auto-cultivator is always constituted by the shafts 3, and there is realised by this method, an essentially homogeneous assembly and an optionally variable equilibrium comprised by the shafts 3, the gear cases 5 and the rods of the pistons of the hydraulic jacks 9, this assembly being carried over the ground by each of the motorised wheels 8 of which the predetermined position permits the equilibrium of the whole.

The equipment of the motor cultivator is completed by a freely directional bracket 15 on a vertical arm situated between the two motorised wheels. It is on this bracket that the cultivating tool 16 is attached.

Thanks to these improvements it can be seen at once that the command of the level of operation by the action of the hydraulic jacks 9, of the motorised wheels 8, with respect to the vertical plane will regulate the vertical uprightness or inclination, at the same time, of the tractor and the cultivating tools, as well as the depth of the furrow. The digging up of the tools 16 will be done by the desired locking of the stop 14 in the sector 13 and the raising of the rear according to the direction of the arrow C while moving the hydraulic jacks 9.

It can likewise be seen that turning about of the auto-cultivator will be done at this time with a much greater facility, which can be compared with any tractor with three wheels.

It is again to be considered that the improvements which have just been described permit of their constructional arrangements to distribute the weights in such a manner that, at rest, when the stop 14 is not engaged in the sector 13, the latter are balanced between themselves on the motorised wheels resting on the ground.

The application of these improvements to tilling apparatus is a great advance and they are thought to be applied for the first time to large and small scale cultivation where their industrial results justify the increases of yield and permit the extension of their use by reason of the results obtained, of which the principles are:

The elimination, on cultivating tools, of the members for grounding and inclination.

The elimination of the raising apparatus for tractors with carried tools.

The same weight carried by each of the motorised wheels.

The possibility of constructing powerful auto-cultivators of a small size.

The ease of changing the depth of working and the inclination of the tools without stopping the auto-cultivator.

The possibility of placing the seat of the driver very much in the rear above the working tools in such a way as to see the work while in action.

The possibility of working with the centre of gravity very low or very high to overlap the tillage in line.

It is evident that according to the power of the auto-cultivators used, the dimensions, shapes, and the dispositions for the use of the improvements could be varied without changing the general and constructive scope of the invention which has just been described.

I claim:

An autocultivator having in combination a motor unit, a supporting bracket for said motor unit pivoted by its rear end thereto so that said bracket can pivot in a vertical plane with respect to the motor unit, a steerable front wheel supported in the front end of said bracket, a sector fast to said front end and a stop fast to the motor unit engaging releasably with said sector to permit the steerable front wheel to be adjusted in vertical position relatively to the motor unit, a motor seated in the motor unit, rear motorised wheels driven by said motor and mounted one at each side of the motor unit, a driving connection between the motor and the motorised wheels consisting of transmission and differential means coupled to the motor, a pair of co-linear rear driving shafts coupled to the differential means, a rear axle casing for said shafts fast to the motor unit, a pivotable gear case pivoted at one end to each extremity of said axle casing so as to be independently movable in a vertical plane about the axis of the shafts and each carrying at their other end one of the motorised wheels, coupling means in said gear cases for coupling each motorised wheel to one of the shafts, a hydraulic jack for each motorised wheel secured at the side of the motor unit, and a movable piston in each jack connected to that end of the respective gear case which carries a motorised wheel, whereby operation of each jack causes the respective gear case to pivot and alter the level of its motorised wheel with respect to the motor unit.

ALBERT DE JOUËTTE.

REFERENCES CITED

The following references are of record in the file of this patent:

UNITED STATES PATENTS

| Number | Name | Date |
| --- | --- | --- |
| 1,175,553 | Newell | Mar. 14, 1916 |
| 1,240,338 | Guard | Sept. 18, 1917 |
| 1,307,918 | Mitchell | June 24, 1919 |
| 1,843,425 | Karsten | Feb. 2, 1932 |
| 2,041,616 | Noell et al. | May 19, 1936 |
| 2,091,509 | Kramer | Aug. 31, 1937 |
| 2,231,710 | Ford | Feb. 11, 1941 |
| 2,278,081 | Kramer | Mar. 31, 1942 |
| 2,365,387 | Briscoe | Dec. 19, 1944 |

FOREIGN PATENTS

| Number | Country | Date |
| --- | --- | --- |
| 126,017 | Great Britain | May 8, 1919 |
| 378,642 | Germany | July 23, 1923 |
| 570,008 | Germany | Feb. 10, 1933 |